Aug. 4, 1959    R. C. DEMI    2,897,890
TIME AND TIMED DELAY CONTROL
Filed Oct. 7, 1955    6 Sheets-Sheet 1

INVENTOR.
ROY C. DEMI.
BY
HIS ATTORNEY.

INVENTOR.
Roy C. Demi.
BY
HIS ATTORNEY.

INVENTOR.
Roy C. Demi.
HIS ATTORNEY.

Aug. 4, 1959  R. C. DEMI  2,897,890
TIME AND TIMED DELAY CONTROL
Filed Oct. 7, 1955  6 Sheets-Sheet 4

INVENTOR.
Roy C. Demi.
BY
*Albert J. Henderson*
HIS ATTORNEY.

INVENTOR.
ROY C. DEMI

Aug. 4, 1959    R. C. DEMI    2,897,890
TIME AND TIMED DELAY CONTROL
Filed Oct. 7, 1955    6 Sheets-Sheet 6

INVENTOR.
Roy C. Demi.
BY
HIS ATTORNEY.

United States Patent Office 2,897,890
Patented Aug. 4, 1959

2,897,890

TIME AND TIMED DELAY CONTROL

Roy Crawford Demi, Greensburg, Pa., assignor to Robertshaw-Fulton Controls Company, Greensburg, Pa., a corporation of Delaware Application October 7, 1955, Serial No. 539,095

5 Claims. (Cl. 161—1)

This invention relates to control devices for appliance heaters and more particularly to timer means for controlling the cooking time for an electric or gas range and the like and means for delaying the cooking time.

In apparatus of this general character, it is customary to provide a timer control separate and apart from the main gas control in the case of a gas range and separate from the selector switches in the case of an electric range. Usually the timer controls are mounted in the back of the range resulting in the use of additional gas valves or electric switches as the case may be, to effect time control of the main gas cock or selector switch.

In gas ranges, a complicated multi-dial control system is usually employed in conjunction with the fuel system and main gas cock for controlling the "on" time cycle to a gas burner. Complications are increased with the addition of a timer means for delaying the cooking interval in the event the user plans a delayed meal. Generally, the housewife must resort to a book of instructions for each cooking and delaying operation in order to insure a complete and well-planned meal.

Electric ranges have been equally burdened with complicated and rather costly timer devices wherein many dials, indicators, pointers and the like must be studied and manipulated so that the housewife must continually resort to a book of instructions for each timed cooking operation. Therefore, it is a principal object of this invention to reduce the manipulative adjustments necessary to a proper cooking and delayed cooking operation.

Another object of the invention is to arrange a pair of timer valves or switches within a single casing.

Another object of this invention is to permit removal of the timer without disturbing other parts of the control.

Another object of this invention is to arrange the parts compactly while insuring ready access for servicing.

In a preferred embodiment of the invention, a pair of timer valves are located in axial alignment with each other within a single casing. A timer housing carried by the casing contains a timer unit operatively connected to the timer valves. A pair of independently manually actuated handles or knobs in coaxial alignment are operatively engageable with the timer unit for independently connecting the timer unit to the valves. Upon manipulation of one of the timer knobs, one of the valves is adapted to prevent the flow of fuel to a burner for a period of time set by the knob. At the termination of this period, said valve is moved to permit fuel flow to the burner and the timer unit is set to control the movement of the other valve to a fluid flow preventing position after a second predetermined time interval. In this manner, the flow of fuel to the burner is adapted to be controlled for a predetermined time interval after a predetermined delaying time interval.

Other objects and advantages will appear from the following specification taken in connection with the accompanying drawings wherein.

Figure 1:
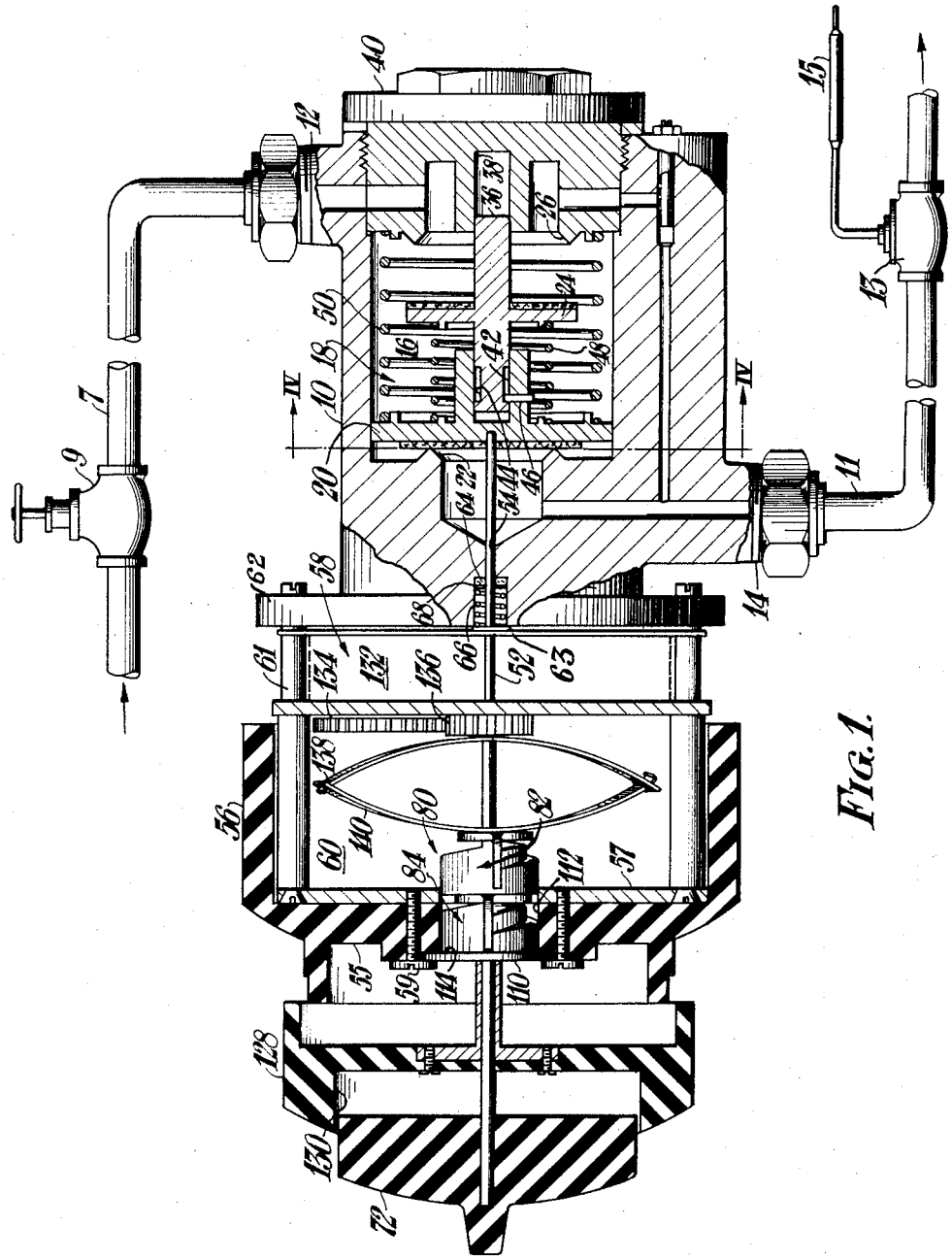
Fig. 1 is a longitudinal sectional view of a control device embodying this invention in one position of operation.

Embodiment of Fig. 1

Figure 2:
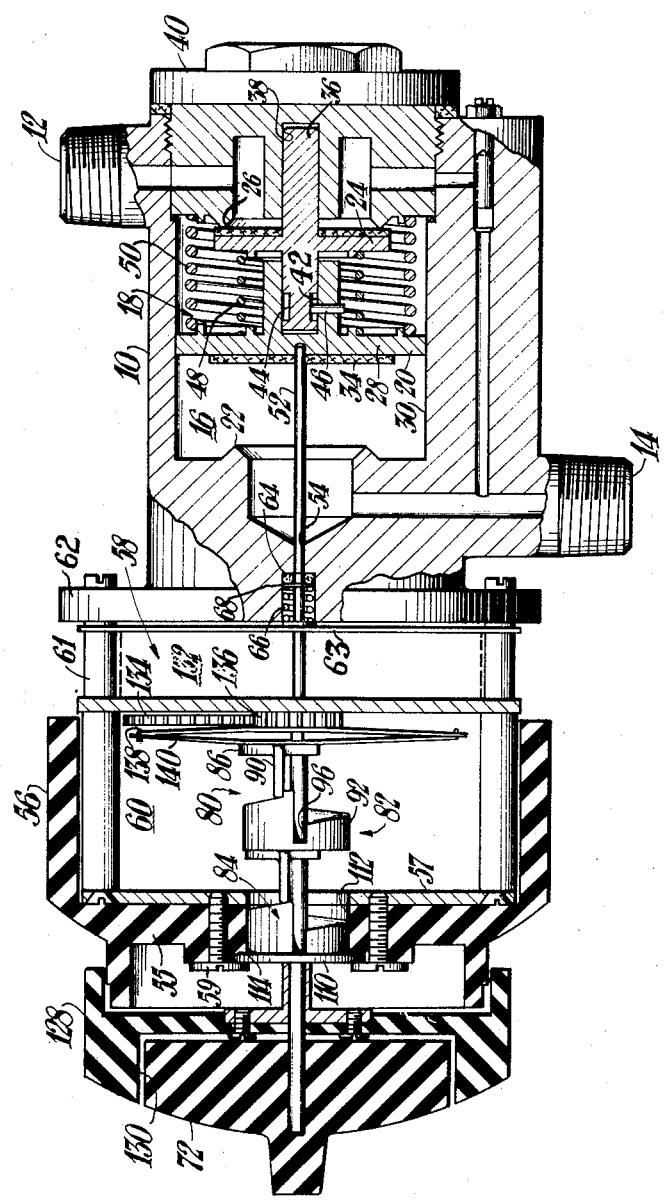
Figs. 2 and 3 are longitudinal sectional views, similar to Fig. 1, showing the control device in various controlling positions.
Figure 3:
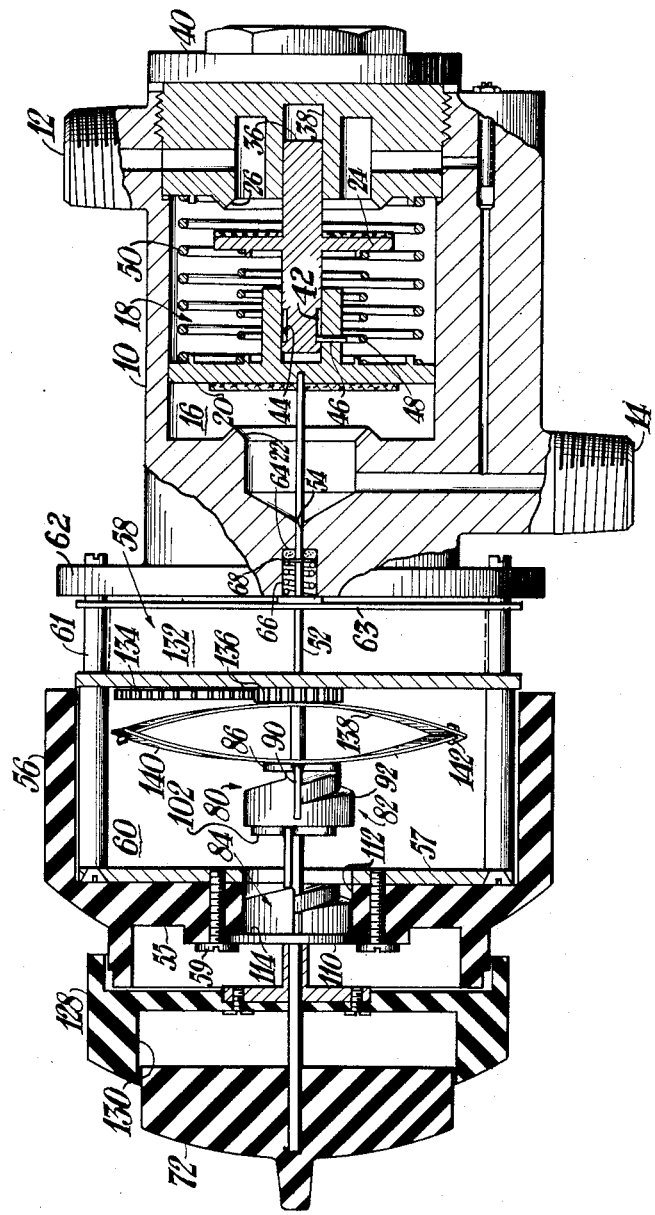

Referring more particularly to Figs. 1 to 3, the control device is shown as comprising a valve casing 10 provided with an inlet 12 which is adapted to be connected to a source of fuel in the form of a fuel pipe 7 controlled by a main gas cock 9, and an outlet 14 communicating with a chamber 16 formed in the casing 10. A fuel pipe 11 connected to the outlet 14 conveys fuel to a main burner (not shown). A thermostatic valve 13 interposed in the pipe 11 and including the usual thermal bulb 15 in heating proximity to a pilot burner (not shown) serves to control the flow of fuel to the main burner in response to the presence or absence of a flame at the pilot burner. The chamber 16 forms a passage for conveying fluid fuel from the inlet 12 to the outlet 14 and contains a dual valve arrangement generally indicated by the reference numeral 18.

The dual valve 18 comprises a valve member 20 which is movable into and out of seating engagement with a valve seat 22 formed interiorly of the casing 10, and a second valve member 24 which is movable into and out of seating engagement with a second valve seat 26 also formed interiorly of the casing 10 substantially as shown in the drawing.

Figure 4:
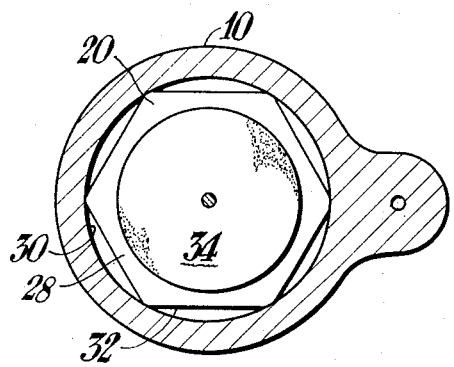
Fig. 4 is a sectional view taken along lines IV—IV of Fig. 1.
Figure 5:
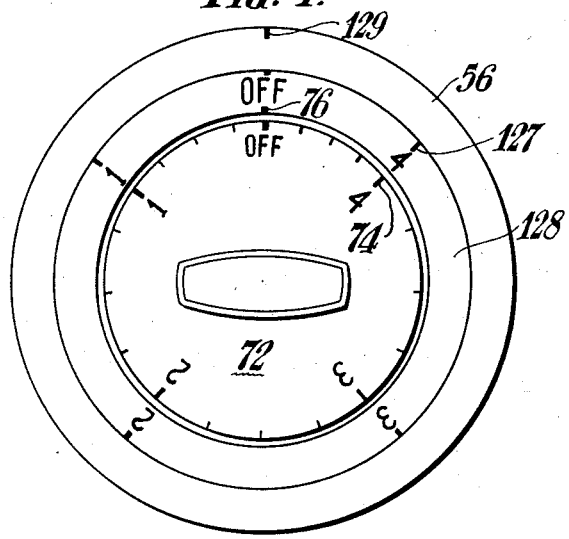
Fig. 5 is a front elevation.

As shown in Fig. 4, the valve member 20 includes a non-circular, specifically a hexagon plate 28 engageable with the interior wall 30 of the casing 10 and having sides 32 spaced from said wall 30 for permitting fuel to flow therebetween. A suitable valve facing 34 is secured to the underside of the plate 28 and is adapted to engage the valve seat 22 to prevent the passage of fuel through the valve seat 22 when the valve member 20 is in closed position.

The valve member 24 is secured medially of a valve stem 36 which has one end slidably projecting into a bore 38 formed on an adjusting closure cap 40 and the other end projecting into a recess 42 formed in the valve member 20. The bore 38 serves as a guide for controlling the alignment of the valve members 20, 24 during movements thereof to controlling positions. Limited relative movement between the valve members 20, 24 is accomplished by the provision of a longitudinal slot 44 formed in the stem 36 and a pin 46 secured to the valve member 20 and extending into the slot 44.

A coil spring 48 is held in compression between the opposed surfaces of the valve members 20 and 24 and serves to bias the same apart but is held from doing so by the abutment of the pin 46 with one wall of the slot 44. The pin 46, the slot 44 and the spring 48 form a means for permitting override of the valve member 20 for a purpose to be described more fully hereinafter. The valve member 20 is normally biased into engagement with the seat 22 and the valve member 24 out of engagement with the seat 26 by a coil spring 50 which surrounds the spring 48 and is held in compression between the opposed surfaces of the hexagon plate 28 and the inner wall of the closure cap 40.

Means for moving the valve members 20, 24 relative to their respective valve seats is provided and is here shown as including an actuator element and a timer mechanism both operatively engageable with the valve member 18. The movable actuator element comprises a shaft 52 which extends slidably through a bore 54 formed in the casing 10 axially of the valve members 20, 24 and into a housing 56 mounted at one end of the casing 10. The housing 56 is preferably made of insulating material and includes a transverse wall 55 formed in the interior thereof. A plate 57 is mounted in face to face abutment with the wall 55 by a plurality of bolts 59. The plate 57 is adapted to be secured to a flange 62, formed on one end of the casing 10, by a plurality of bolts 62 thus serving as a means for securing the casing 56 to the casing 10. A timing mechanism generally indicated by the reference numeral 58 is secured to the casing 56 adjacent the flange 62 by the bolts 61.

The housing 56 is also provided with a chamber 69, defined by the interior wall thereof, the plate 57 and the timer movement 58, through which the shaft 52 extends, the shaft being free to rotate and move axially relative to the housing 56.

The valve assembly 18 is normally biased outward to the left as viewed in Figs. 1–3 by the coil spring 50 and fuel is prevented from escaping from the valve chamber 16 between the shaft 52 and the walls of the bore 54 by the provision of an annular sealing element 64 which encompasses the shaft 52 and is held in sealing engagement therewith by a spring 66 acting between a washer 68 abutting the sealing element and the adjacent surface of partition 63.

The other end of the shaft 52 extends through the wall 55 of the housing 56 and carries a manually operable handle or knob 72 for actuating the shaft 52. Manual manipulation of the knob 72 serves to axially move the shaft 52 and the valve assembly 18 against the bias of the spring 50 to unseat the valve member 20 and to seat the valve member 24. Suitable indicia 74 indicating units of time are imprinted on the knob 72 for registry with a reference mark 76 for a purpose which will more fully appear hereinafter.

Figure 6:
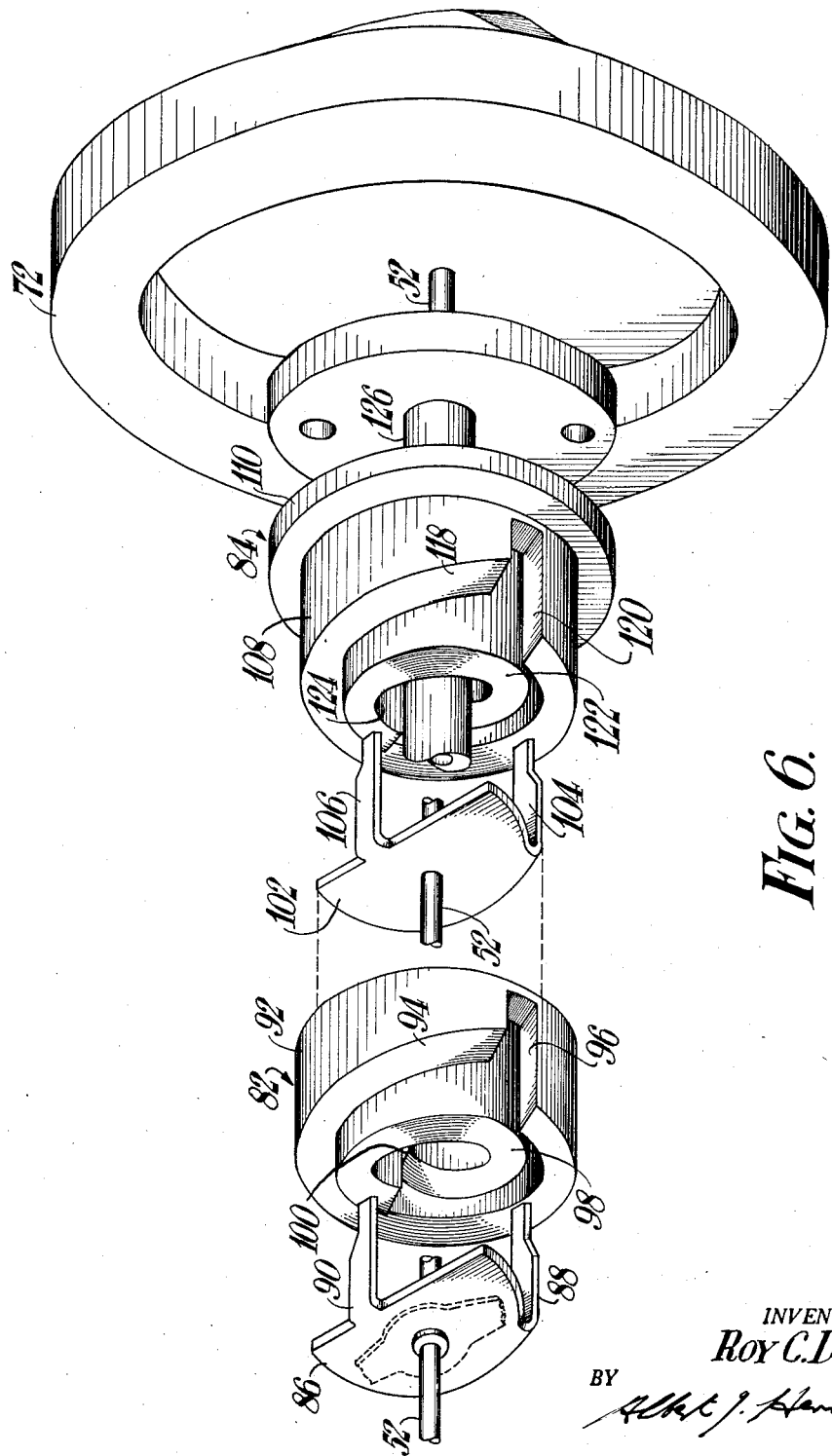
Fig. 6 is a fragmentary perspective view of a detail of the present invention.

The casing 56 also houses a stacked or double detent mechanism generally indicated by the reference numeral 80 and as shown more clearly in Fig. 6 comprises a first detent mechanism 82 and a second detent mechanism 84. Secured to the medial portion of the shaft 52 within the chamber 60 is a plate 86 which carries a pair of oppositely disposed abutment means or followers which take the form of projections 88, 90 extending from the plate 86 and disposed parallel to the axis of the shaft 52. The follower 88 is positioned slightly farther from the axis of the shaft 52 than is the follower 90 for a purpose which will more fully appear hereinafter. The followers 88, 90 are engageable with a cam assembly 92 of the detent mechanism 82 for permitting controlled axial movement of the shaft 52.

As shown in Fig. 6, the cam assembly 92 is annular with one end portion thereof defining a first helical surface 94 for cooperation with the follower 88. The helical surface 94 extends through approximately 350° with the high and low extremities thereof separated by a relieved portion or recess 96 which extends parallel to the axis of the shaft 52 and is adapted to receive the follower 88 of the plate 86. Coaxial with and positioned radially inward of the helical surface 94 is a second helical surface 98 which extends through approximately 350° with the high and low extremities thereof being separated by a relieved portion or recess 100. The recess 100 is substantially diametrically opposed to the recess 96 and is adapted to receive the follower 90 of the plate 86.

The lead of the helical surface 94 is substantially similar to the lead of the helical surface 98. However, since the helical surface 94 is disposed radially outward of the helical surface 98, it will be apparent that the helix angle of the former will be smaller than the helix angle of the latter. The shaft 52 extends slidably and rotatably through the open center of the annular cam assembly 92 so that axial movement of the shaft 52 in one direction is limited by engagement of the followers 88, 90 with the cam assembly 92.

It will be apparent that the axial thrust exerted on the shaft 52 by the spring 50 will be transmitted directly to the followers 94, 98 carried thereby. Since the helical surfaces 88, 90 are disposed at an angle to the line of action of this force, a portion of the force will be transformed to torque and will tend to rotate the shaft 52 with accompanying slidable movement of the followers 88, 90 down the helical surfaces 94, 98. However, the helical surfaces 94, 98 will exert a reactive force on the followers 88, 90, a portion of which will comprise a torsional component acting in a direction to resist such slidable action of the followers 88, 90.

It is an important feature of this invention that the coacting surfaces of the followers 88, 90 and the relatively stationary cam assembly 92 be so arranged that the operating force acting upon the actuating shaft 52 will produce a component of force slightly larger in magnitude and opposite in direction to the reactive component of force resulting from friction between such surfaces.

As previously stated, the helix angle of the surface 94 is smaller than the helix angle of the surface 98. It is desirable that the resistive force produced by the frictional engagement of the follower 88 upon the surface 94 be slightly greater than the force which tends to move the follower 88 along the surface 94. Accordingly, the helical surface 94 is formed with a relatively small helix angle selected to produce the desired resistance to slidable movement. In order to produce a slidable component of force slightly larger than the resistive component of force, the helix angle of the surface 98 is made slightly larger so that the force tending to produce slidable movement between the follower 90 and the surface 98 is slightly greater than the resistive force tending to inhibit this slidable movement.

From the foregoing, it will be apparent that the total torque acting on the shaft 52 as a result of the axial load thereon will be determined by the summation of the tendency toward slidable movement produced by engagement of the follower 90 with the helical surface 98 and the tendency to resist slidable movement produced by the engagement of the follower 88 with the surface 94. The helix angles of the surfaces 94, 98 are selected to produce a near-balance condition with the moment exerted on the shaft 52 and on the follower 88 being slightly less than the moment exerted on the shaft 52 by the follower 90. Thus, the shaft 52 will tend to rotate and move axially by the force exerted by the spring 50 but is prevented thereby by an escapement mechanism of the timing mechanism 58.

A second follower plate 102 is secured by any suitable means to the undersurface of the cam assembly 92, as viewed in Fig. 6, and carries a pair of oppositely disposed followers 104, 106 extending from the plate 102 and disposed parallel to the axis of the shaft 52. The follower 104 is positioned slightly farther from the axis of the shaft 52 than is the follower 106 as was the case for the followers 88, 90, with respect to the plate 86.

The followers 104, 106 are adapted to cooperate with the cam assembly 108 of the detent mechanism 84 for permitting controlled axial movement of the cam assembly 92 and the shaft 52. The cam assembly 108 includes a radial flange 110 which is adapted to be seated in a suitable recess 112 formed in the housing 56. The flange 110 is retained in the recess 112 by a shoulder 114 which underlies the flange 110 and is secured to the housing 56 by the screws 59.

An annular body portion extends axially from the flange 110 with the end portion thereof being shaped to define a first helical surface 118. The helical surface 118 extends through approximately 350° with the high and low extremities thereof separated by a relieved portion or recess 120 which extends parallel to the axis of the shaft 52 and is adapted to receive the follower 104 of the plate 102. Coxial with and positioned radially inward of the helical surface 118 is a second helical surface 122 which extends through approximately 350° with the high and low extremities thereof being separated by a relieved portion or recess 124. The recess 124 is substantially diametrically opposed to the recess 120 and is adapted to receive the projection 106 of the plate 102.

It is to be noted that the plate 86 and the followers 88, 90 are approximately the same shape and size as the plate 102 and the projections 104, 106 respectively. The cam assembly 92 is similar to the cam assembly 108 but differs therefrom in that the helical surfaces 118, 122 are disposed at different angles with respect to the shaft 52, as will presently appear.

The shaft 52 extends slidably and rotatably through the open center of the plate 102 and the cam assembly 108 but since the plate 102 is mounted upon the cam assembly 92, the axial movement of the shaft 52 in one direction is limited by the engagement of the followers 104, 106 with the cam assembly 108. An actuating sleeve 126 encircles a portion of the shaft 52 and is secured at one end to the plate 102 to be movable therewith and at the other end to a manually operable knob 128 which is formed with a coaxial recess 130 for receiving the knob 72 therein. Manual manipulation of the knob 128 serves to axially move the sleeve 126, the cam assembly 92 and the valve assembly 18 to the right, as viewed in Fig. 1 to unseat the valve member 20. Suitable indicia 127 indicating units of time are imprinted on the knob 128 for registry with a reference mark 129 on the casing 56. It is to be noted that the reference mark 76 is imprinted in the knob 128 to be movable therewith as will presently appear.

As shown in Figs. 1 through 3, the cam assemblies 92, 108, the shaft 52 and the sleeve 126, and the knobs 72, 128 are positioned in axial alignment with the valve assembly 18. The length of the actuator shaft 52 is such that, when the followers 104, 106 are positioned within the recesses 120, 124, and the followers 88, 90 are positioned within the recesses 96, 100, the spring 50 will hold the valve element 20 in its biased or closed position in engagement with the valve seat 22, and the valve member 24 in its open position with respect to the valve seat 26, as shown in Fig. 1.

However, when the sleeve 126 is moved axially to move the followers 104, 106 out of the recesses 120, 124, the shaft 52 is moved against the bias of the spring 50 to space the valve element 20 from the valve seat 22, as shown in Fig. 2, thereby permitting fuel flow through the space between the walls 30, 32 and into the outlet 14. If the sleeve 126 is rotated after it has moved the valve element 20 to open position, the followers 104, 106 will engage the helical surfaces 118, 122 and the valve element 20 will be retained in its open position.

In similar fashion, when the shaft 52 is moved axially by manual manipulation of the knob 72, the followers 88, 90 are moved out of the recesses 96, 100 to axially move the valve assembly 18 further to the right as viewed in Fig. 1 to position the valve element 24 upon its seat 26 thereby restricting the flow of fuel into the valve chamber 16, as shown in Fig. 3.

It will be apparent that the axial thrust exerted on the actuating sleeve 126 by the spring 50 will be transmitted directly to the followers 104, 106 carried by the cam assembly 92. As previously stated, the helix angles of the helical surfaces 118, 122 are different from the helix angles of the corresponding helical surfaces 94, 98. This differential in corresponding helix angles constitutes an important feature of the invention as will now be described.

Since the helical surfaces 118, 122 are disposed at an angle to the line of action of the force exerted by the spring 50, a portion of the force will be transformed to torque and will tend to rotate the sleeve 126 with accompanying slidable movement of the followers 104, 106 down the helical surfaces 118, 122 respectively. However since the helical surfaces 118, 122 will exert a reactive force on the followers 104, 106, a portion of which will comprise a torsional component acting in a direction to resist slidable action on the followers 104, 106.

It is an important feature of this invention that the coacting surfaces of the followers 104, 106 and the relatively stationary cam assembly 108 be so arranged that the operating force acting upon the actuating sleeve 126 will produce a component of force substantially equally in magnitude and opposite in direction to the reactive component of force resulting from friction between such surfaces regardless of the magnitude of the operating force of the spring 50. With such an arrangement, an extremely small force may be utilized to disengage the movable actuating sleeve 126 from the stationary or cam assembly 108.

As previously stated, the helix angle of the surface 118 is smaller than the helix angle of the surface 122. It is desirable that the resistive force produced by the frictional engagement of the follower 104 upon the surface 118 be slightly greater than the force which tends to move the follower 104 along the helical surface 118. Accordingly, the helical surface 118 is formed with a relatively small helix angle selected to produce the desired resistance to slidable movement. In order to balance these tendencies, the helix angle of the surface 122 is made slightly larger so that the force tending to produce slidable movement between the follower 106 and the surface 122 is slightly greater than the resistive force tending to inhibit the slidable movement.

From the foregoing, it will be apparent that the total torque acting on the sleeve 126 as a result of the axial load thereon will be determined by the summation of the tendency toward slidable movement produced by the engagement of the follower 106 with the helical surface 122 and the tendency to resist slidable movement produced by the engagement of the follower 104 with the helical surface 118. The helix angles of the surfaces 118, 122 are selected to produce a balanced condition with the moment exerted on the sleeve 126 by the follower 106 being substantially balanced by the moment exerted on the sleeve 126 by the follower 104. Thus, rotation and axial movement of the sleeve 126 may be effected by the application thereto of a relatively small torque without regard to the magnitude of the axial thrust on the sleeve 126 by the biasing effect of the spring 50.

As previously stated, the helical surfaces 94, 98 are so designed that the shaft 52 will tend to rotate as a result of the axial load thereon. On the other hand, the helical surfaces 118, 122 are so designed as to produce a balanced condition wherein the tendency to rotate is balanced by the tendency to resist rotation. From this, it is obvious that with the plates 86 and 102 in the positions shown in Fig. 3, the plate 86 and the shaft 52 will rotate as the followers 88, 90 slide down the helical surfaces 94, 98. When the followers 88, 90 are disengaged from the surfaces 94, 98, the followers 88, 90 will move rapidly into the recesses 96, 100 and the shaft 52 will move rapidly downward as viewed in Fig. 2. Since the followers 104, 106 are in balanced positions upon the surfaces 118, 122, rotation of the sleeve 126 can be effected only by the application thereto of a relatively small torque. Therefore, it is apparent that the design of the cam assemblies of the detent mechanisms 82, 84 are such that for all operations, the followers 88, 90 will always slide relative to the surfaces 94, 98 before the sliding of the followers 104, 106 along the surfaces 118, 122.

Means is provided for applying a control force to the valve actuating shaft 52 to effect release of the movable operating member 126 from the cam assembly 108. This means takes the form of an escapement controlled clock movement generally indicated by the reference numeral 132. The movement 132 is disposed within the housing 56 and is secured thereto by any suitable means.

The movement 132 may be of any conventional type and is shown here as including a driven gear 134 which meshes with a pinion 136 and is adapted to receive the shaft 52 so that the same may move axially relative to the pinion 136 while a torque transmitting relation is maintained therebetween. This connection is here shown as comprising a first leaf spring 138 secured at its medial portion to the pinion 136 and a second leaf spring 140 secured at its medial portion to the plate 86 which is secured to the shaft 52. The juxtaposed ends of the leaf springs 138, 140 are connected together at 142 so that rotational movement will be transmitted between the pinion 136 and the shaft 52 but, upon axial movement of the shaft 52, the springs 138, 140 will flex, causing no axial displacement of the pinion 136.

*Operation of the embodiment of Fig. 1*

When no fuel is flowing to the main burner and the gas cock 9 is moved to a closed position, the various parts of the control device are positioned as shown in Fig. 2, that is, fuel is prevented from entering the chamber 16 by the seating of the valve member 24 upon the valve seat 26.

To place the control device in operative condition, the sleeve 126 is moved axially with respect to the casing 56 against the bias of the spring 50 by manipulation of the timing knob 128 to the position wherein the followers 104, 106 of the plate 102 are moved out of the recesses 120, 124 beyond the outer extremities of the helical surfaces 118, 122. In this position of the plate 102, the cam assembly 92, the actuating member 52 and the valve assembly 18 would have moved to the right and in the position shown in Fig. 2. The knob 128 is then rotated to a desired time setting by aligning the desired indicia 127 with the reference mark 129. Rotation of the knob 128 will enable the followers 104, 106 to engage the helical cam surfaces 118, 122, respectively and hold the valve assembly 18 in the position shown in Fig. 3 wherein both valve members 20, 24 are unseated.

The actuating member 52 is then moved axially with respect to the knob 128 against the bias of the spring 50 by manipulation of the delayed timing knob 72 to the position wherein the followers 88, 90 of the plate 86 are moved out of the recesses 96, 100 beyond the outer extremities of the helical surfaces 94, 98, respectively. In this position of the plate 86, the valve assembly 18 would have moved to the right to position the valve member 24 in engagement with the valve seat 26, as shown in Fig. 2, to prevent the flow of fuel from entering the chamber 16 from the inlet 12.

The knob 72 is then rotated to a desired delay time setting by aligning the desired indicia 74 with the reference mark 76 on the knob 128. Rotation of the knob 72 will enable the followers 88, 90 to engage the helical surfaces 94, 98, respectively and hold the valve assembly 18 in the position shown in Fig. 2 where the valve member 24 is in engagement with the valve seat 26 to prevent the flow of fuel into the chamber 16 and consequently to the main burner (not shown).

As hereinbefore pointed out, the helix angles of the helical surfaces 94, 98 are such that the tendency toward rotational movement of the shaft 52 is slightly greater than the frictional force resisting such movement. The shaft 52 will, therefore, tend to move axially to the left as viewed in Fig. 3 but is prevented therefrom by the backlash of the gears 134, 136 and the clock movement 132 acting upon the plate 86 and the springs 138, 140.

The rotational setting movement of the knobs 72 and 128 also rotates the pinion 136 which drives the gear 134 and winds the mainspring (not shown) of the clock movement 132. When the knob 72 is released, the torque of the mainspring is transmitted directly to the gear 134 and the pinion 136, the escapement mechanism (not shown) of the timer movement 132 controlling the speed of rotation of the pinion 136, the plate 86, the shaft 52 and the knob 72 to their initial angular positions.

When the mainspring (not shown) has rotated the shaft 52 to its initial angular position, the followers 88, 90 become disengaged from the helical surfaces 94, 98 and, since the followers 88, 90 are then aligned with the recesses 96, 100, the shaft 52 will be moved rapidly to the left as viewed in Fig. 2 until the followers 88, 90 engage the bottom of the recesses 96, 100, respectively. Simultaneously with this axial movement of the shaft 52, the valve assembly 18 will move to the left to the position occupied in Fig. 3 wherein both valve members 20, 24 are unseated. In this position of the valve assembly 18, fuel will flow from the inlet 12, through the chamber 16, to the outlet 14 and to the main burner (not shown) where it will be ignited manually or by a pilot burner (not shown).

When the followers 88, 90 move into the recesses 96, 100, further movement of the valve assembly 18 is under control of the cam assembly 108. As hereinbefore pointed out, the helix angles of the helical surfaces 118, 122 are such that the tendency toward rotational movement of the shaft 52 is balanced by the frictional force resisting such movement. With the followers 88, 90 retained in the recesses 96, 100, the plates 86 and 102 are, in effect, secured to each other so that the moment exerted on the shaft 52 will now be transmitted to the plate 102. The torque of the mainspring (not shown) continues to be transmitted to the gears 134 and 136 and the escapement mechanism of the timer movement 132 will control the speed of rotation of the pinion 136, the plate 102, the shaft 52 and the knob 72 to their initial angular positions.

When the mainspring (not shown) has rotated the sleeve 126 to its initial angular position, the followers 104, 106 become disengaged from the helical surfaces 118, 122 and, since the followers 104, 106 are then aligned with the recesses 120, 124, the shaft 52 will be moved to the left as viewed in Fig. 1 until the followers 104, 106 engage the bottom of the recesses 120, 124. Simultaneously with this axial movement of the shaft 52, the valve assembly 18 will move to the left as viewed in Fig. 1 until the valve member 20 is in engagement with the valve seat 22 and thus prevents further flow of fuel to the outlet 14 and the main burner (not shown).

If it is desired to eliminate control of fluid flow by the delayed timing cam assembly 92 so that the valve assembly 18 is actuated to permit fuel flow to the main burner immediately rather than after a predetermined time period, it is only necessary to actuate the timer knob 128 to move the valve assembly 18 to the position shown in Fig. 2. In this position, fuel will be permitted to flow to the main burner until the clock movement 132 has terminated its control upon the cam assembly 108 as hereinbefore pointed out.

Figure 7:
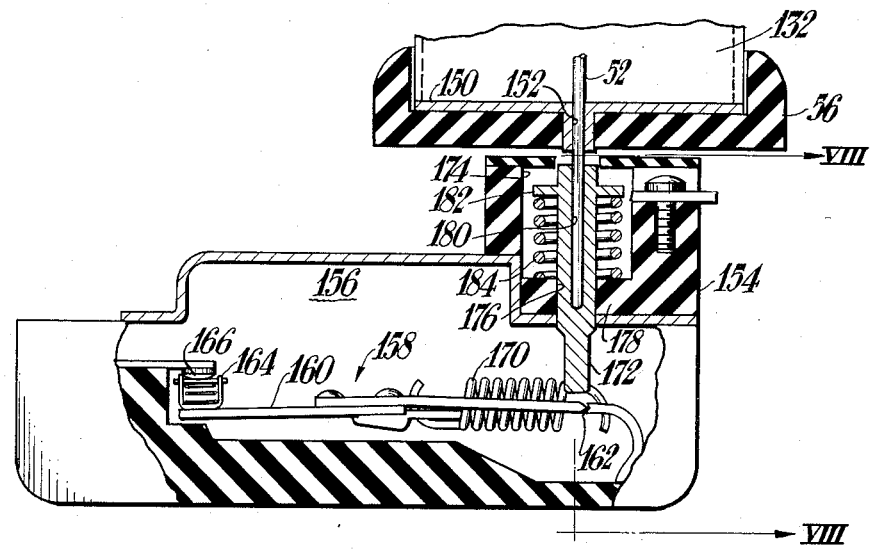
Fig. 7 is a fragmentary sectional view of another embodiment of the invention.

*Embodiment of Fig. 7*

Figure 9:
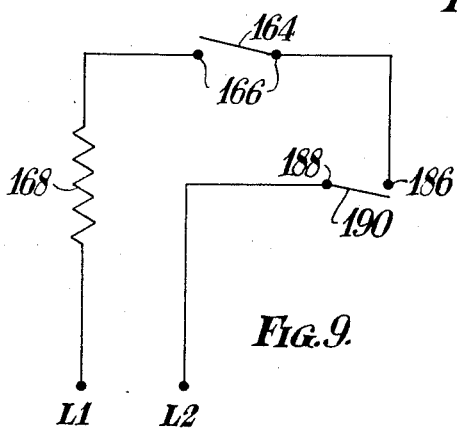
Fig. 9 is a wiring diagram applicable to the embodiment of Fig. 7.
Figure 8:
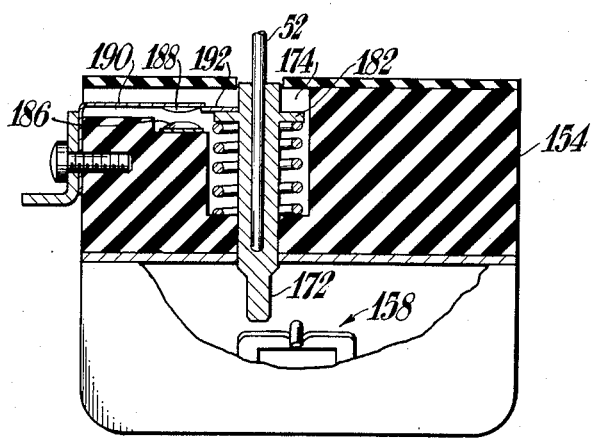
Fig. 8 is a sectional view taken along lines VIII—VIII of Fig. 7.

Referring now to Figs. 7 through 9, a modified construction is illustrated therein in which like numerals designate parts corresponding to those of the Fig. 1 embodiment. The present embodiment is a departure from that shown in Figs. 1 through 6 in that the timer and detent mechanism is utilized to control a switch mechanism for an electric heater means or the like. The timer housing 56 is provided with a cover plate 150 having a central bore 152 therein for slidably mounting the shaft 52. The housing 56 is rigidly mounted by any suitable means upon a switch casing 154, having an interior chamber 156, in such a manner that the shaft 52 is disposed within the chamber 156.

The casing 154 is preferably constructed of insulation material and is provided with a snap-action mechanism 158, of the conventional type, disposed within the chamber 156 to be actuated by the detent mechanism and the timer movement as will presently appear. The snap-action mechanism 158 is provided with a control lever 160 which is adapted to be rotated with a snap-movement about a pivot 162 as readily understood by those in the art. A contact bridge 164 located on the end of the lever 160 and movable therewith serves to bridge a pair of contacts 166 (only one of which is shown in Fig. 7). The control lever 160 is normally biased in a clockwise direction by a snap-action spring 170 and normally holds the control bridge 164 in engagement with the contacts 166 as shown in Fig. 7. In Fig. 9 the contacts 166 are shown as connected in a series circuit comprising a heater element 168 and a source of electric current L1, L2.

Means for actuating the lever 160 in a counterclockwise direction to disengage the contact bridge 164 from the contacts 166 is provided and takes the form of a plunger 172 disposed within a chamber 174 formed in the casing 154 and slidably received in a bore 176 formed in a wall 178 of the casing 154. The plunger 172 is internally bored at 180 for slidably receiving the actuating shaft 52 of the timing mechanism. A radially extending flange 182 is formed on one end of the plunger 172 and a spring 184 is held in compression between the flange 182 and the wall 178 of the casing 154 for biasing the plunger 172 and the shaft 52 upwardly. It is to be noted that the spring 184 performs the same function as the spring 50 in the embodiment of Fig. 1, that is, to exert an axial force on the shaft 52 for imparting axial and rotative movement to the plates 86 and 102. The lower end of the plunger 172 is spaced from the lever 160 and adapted to abut thereon for rotating the lever 160 in a counterclockwise direction to disengage the contact bridge 164 from the fixed contacts 166.

As shown in Fig. 8, a stationary contact 186 is positioned within the chamber 174 of the casing 154 and is normally engageable by a movable contact 188 mounted on one end of a resilient switch arm 190, the other end of the arm 190 being mounted on the casing 154 by any suitable means. In Fig. 9, the contacts 186, 188 are shown in series with the source of current L1, L2, the heater coil 168 and the contacts 166. A projection 192 is carried on the flange 182 to be movable therewith and is adapted to engage the switch arm 190 for moving the movable contact 188 against the bias of the arm 190 for disengaging the movable contact 188 from the fixed contact 186 during the upward travel of the plunger 172 under the bias of the spring 184.

*Operation of the embodiment of Fig. 7*

With the parts of the control device positioned as shown in Figs. 7 and 8, that is, the contact 166 engaged by the bridge 164 and the contacts 186, 188 disengaged under the bias of the spring 184, no current is flowing in the heater coil 168.

To place the controlling device in operative condition, the timing knob 128 is axially manipulated to move the actuating shaft 52 and the plunger 172 downwardly as viewed in Fig. 8 against the bias of the spring 184. Downward movement of the plunger 172 will position the lower end thereof in engagement with the control lever 160 adjacent to the pivot 162 and move the projection 192 away from the arm 190 for permitting engagement of the contacts 186, 188. As in the embodiment of Fig. 1, this manipulation of the timing knob 128 would have positioned the cam followers 104, 106 upon the surfaces 118, 122, respectively and have moved the cam assembly 82 to the left as viewed in Fig. 6.

The actuating member 52 and the plunger 172 are again moved axially by manipulation of the delay timing knob 72 to the position wherein the followers 88, 90 of the plate 86 are positioned on the surfaces 94, 98, respectively. In this movement of the plunger 172, the control lever 160 will rotate with a snap-action in a counterclockwise direction to disengage the bridge 164 of the contacts 166 to open the circuit to the heater coil 168.

After a predetermined time interval set by the delayed timing knob 72, the main spring of the timing movement 132 will rotate the plate 86 to its initial angular position when the followers 88, 90 engage the bottom of the recesses 96, 100, respectively thus permitting axial movement of the shaft 52 and the plunger 172. Simultaneously with this movement of the plunger 172, the control lever 160 will rotate in a clockwise direction with a snap-action to close the contact 166 to complete the circuit to the heater coil 168 and effect energization thereof. When the followers 88, 90 move into the recesses 94, 98 further control of the heater circuit is under control of the cam assembly 108.

After a predetermined time interval set by the timing knob 128, the main spring will rotate the plate 102 to its initial angular position when the followers 104, 106 engage the bottom of the recesses 120, 124 respectively, thus permitting axial movement of the plunger 172 away from the control lever 160 and the engagement of the projection 192 with the switch arm 190. With the projection 192 in its initial position, the contact 188 is disengaged from the stationary contact 186 and the circuit to the heater coil 168 is broken.

If it is desired to effect energization of the heater coil 168 immediately without the intervention of any delay, it is only necessary to actuate the timer knob 128 to permit the closing of the contacts 186, 188. Since the contacts 168 are normally closed by the bridge 164, energization of the heater coil 168 will begin when the contacts 186, 188 are in engagement and the heating period will terminate when the timing knob 128 has rotated to its initial angular position.

It will be apparent from the foregoing that the illustrated embodiment provides a new and improved control device and accomplishes the objects of the invention. It will also be obvious to those skilled in the art that the illustrated embodiment may be variously changed and modified, or features thereof, singly or collectively embodied in other combinations than those illustrated without departing from the scope of the invention or sacrificing all of the advantages thereof, and that accordingly the disclosure herein is illustrative only and the invention is not limited thereto.

I claim:

1. A control device comprising a plurality of detent mechanisms, each of said detent mechanisms including at least one bearing surface and an element having a surface coaxially disposed relative to said bearing surface and being movable into frictional engagement with said bearing surface, means for applying a force to each of said movable elements tending to impart slidable movement thereon relative to said bearing surface, said bearing surface of one of said detent mechanisms being constructed and arranged to render said frictional engagement effective to produce a resistive force tending to prevent said slidable movement substantially balanced by the force tending to produce said slidable movement, another of said detent mechanisms being constructed and arranged to render said frictional engagement effective to produce a resistive force tending to prevent said slidable movement slightly less than the force tending to produce said slidable movement, and actuating mechanism operable on each said movable elements for imparting controlled movement thereto.

2. A control device comprising a plurality of detent mechanisms, each of said detent mechanisms including a bearing surface and an element having a surface coaxially disposed relative to said bearing surface and being movable into frictional engagement therewith, means for applying a force to each of said movable elements tending to impart slidable movement thereto relative to each of said bearing surfaces respectively, said bearing surface of one of said detent mechanisms being constructed and arranged to render said frictional engagement effective to produce a resistive force tending to prevent said slidable movement substantially balanced by the force tending to produce said slidable movement, another of said detent mechanisms being constructed and arranged to render said frictional engagement effective to produce a resistive force tending to prevent said slidable movement slightly less than the force tending to produce said slidable movement, and timer control means operable on said elements for controlling the slidable movement thereof.

3. A control device comprising a plurality of detent mechanisms, each of said detent mechanisms including at least one bearing surface and an element having a surface coaxially disposed relative to said bearing surface and being movable into frictional engagement therewith, means for applying a force to each of said movable elements tending to impart slidable movement thereto relative to each of said bearing surfaces respectively, said bearing surface of one of said detent mechanisms being constructed and arranged to render said frictional engagement effective to produce a resistive force tending to prevent said slidable movement substantially balanced by the force tending to produce said slidable movement, another of said detent mechanisms being constructed and arranged to render said frictional engagement effective to produce a resistive force tending to prevent said slidable movement slightly less than the force tending to produce said slidable movement whereby slidable movement will be imparted initially to said one detent mechanism, and means operable on said movable elements for imparting a controlled movement thereto.

4. A control device comprising a plurality of detent mechanisms, each of said detent mechanisms including a plurality of bearing surfaces and an element having surfaces coaxially disposed relative to said plurality of bearing surfaces and being movable into engagement therewith, means for applying a force to each of said movable elements tending to impart slidable movement thereto relative to said bearing surfaces, said bearing surfaces of one of said detent mechanisms being constructed and arranged to render said frictional engagement effective to produce a resistive force tending to prevent said slidable movement substantially balanced by the force tending to produce said slidable movement, another of said detent mechanisms being constructed and arranged to render said frictional engagement effective to produce a resistive force tending to prevent said slidable movement slightly less than the force tending to produce said slidable movement thereby tending to effect sequential operation of said detent mechanisms, and means operatively connected to said movable elements for imparting the controlled movement thereto.

5. A control device comprising a plurality of detent mechanisms, each of said detent mechanisms including a bearing surface and an element having a surface coaxially disposed relative to said bearing surface and being movable into frictional engagement therewith, an actuator operatively connected to the element of each said detent mechanisms, means for applying a force to said actuator tending to impart slidable movement of said elements relative to said bearing surface, said bearing surface of one of said detent mechanisms being constructed and arranged to render said frictional engagement effective to produce a resistive force tending to prevent said slidable movement substantially balanced by the force tending to produce said slidable movement, another of said detent mechanisms being constructed and arranged to render said frictional engagement effective to produce resistive force tending to prevent said slidable movement slightly less than the force tending to produce said slidable movement whereby said one detent mechanism will be operable before said other detent mechanism, and means operatively connected to said actuator for imparting a controlled movement thereto thereby causing operation of said detent mechanisms.

References Cited in the file of this patent

UNITED STATES PATENTS

| | | |
|---|---|---|
| 1,715,125 | Feit | May 28, 1929 |
| 2,048,607 | Griffey | July 21, 1936 |
| 2,060,299 | Gensburg | Nov. 10, 1936 |
| 2,142,950 | Loeffler | Jan. 3, 1939 |
| 2,166,683 | Grayson | July 18, 1939 |
| 2,440,142 | Elliott | Apr. 20, 1948 |
| 2,451,730 | Greenlee | Oct. 19, 1948 |
| 2,458,853 | Hughes | Jan. 11, 1949 |
| 2,459,583 | Peter | Jan. 18, 1949 |
| 2,545,617 | Kaefer et al. | Mar. 20, 1951 |
| 2,658,410 | Livers | Nov. 10, 1953 |
| 2,693,232 | Hoff et al. | Nov. 2, 1954 |
| 2,810,435 | Demi et al. | Oct. 22, 1957 |